(12) United States Patent  (10) Patent No.: US 8,547,044 B2
Vollmer  (45) Date of Patent: Oct. 1, 2013

(54) DETERMINING THE ROTOR ANGLE OF A SYNCHRONOUS MACHINE AT STANDSTILL WITH THE AID OF ITERATIVE TEST PULSES

(75) Inventor: Ulrich Vollmer, Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 12/998,197

(22) PCT Filed: Aug. 17, 2009

(86) PCT No.: PCT/EP2009/060589
§ 371 (c)(1),
(2), (4) Date: Jun. 13, 2011

(87) PCT Pub. No.: WO2010/034568
PCT Pub. Date: Apr. 1, 2010

(65) Prior Publication Data
US 2011/0241658 A1  Oct. 6, 2011

(30) Foreign Application Priority Data

Sep. 25, 2008  (DE) .......................... 10 2008 042 360

(51) Int. Cl.
*H02P 6/18* (2006.01)
*H02P 6/20* (2006.01)

(52) U.S. Cl.
USPC ........... 318/432; 318/434; 318/721; 318/722; 318/767; 318/778; 318/798

(58) Field of Classification Search
USPC ................. 318/432, 434, 721, 722, 767, 778, 318/798
See application file for complete search history.

(56) References Cited

U.S. PATENT DOCUMENTS

| 5,117,165 | A | * | 5/1992 | Cassat et al. | 318/400.11 |
| 5,254,914 | A | * | 10/1993 | Dunfield et al. | 318/400.34 |
| 6,005,364 | A | * | 12/1999 | Acarnley | 318/632 |
| 7,795,830 | B2 | * | 9/2010 | Johnson | 318/432 |
| 2008/0067964 | A1 | | 3/2008 | Maeda et al. | |

FOREIGN PATENT DOCUMENTS

| AT | 397 727 | 6/1994 |
| DE | 10 2006 004 166 | 8/2007 |
| JP | 2004266987 | 9/2004 |
| JP | 2007174721 | 7/2007 |
| JP | 2008220087 | 9/2008 |
| WO | WO 03/036788 | 5/2003 |
| WO | WO 2005/046043 | 5/2005 |

* cited by examiner

*Primary Examiner* — Eduardo Colon Santana
*Assistant Examiner* — Gabriel Agared
(74) *Attorney, Agent, or Firm* — Kenyon & Kenyon LLP (57) ABSTRACT

A method for determining the angular position of a synchronous machine having a magnetically anisotropic rotor includes an (m) iteration stage and an (n) iteration stage. The (m) iteration stage encompasses: generating an (m) magnetic field of an (m) angular direction and acquiring an (m) peak value of the current pulse generated by the (m) voltage pulse; and providing at least two further (m+i) peak values in different (m+i) angular directions that differ from the (m) angular direction. The (n) iteration stage includes: ascertaining the angular directions (n) and (n+1) in which the two highest or the two lowest peak values from a peak value group occur; and providing an (n) angular direction, which resides between the (n+1) angular direction and the (n+2) angular direction, as an angular position output.

10 Claims, 5 Drawing Sheets

DETERMINING THE ROTOR ANGLE OF A SYNCHRONOUS MACHINE AT STANDSTILL WITH THE AID OF ITERATIVE TEST PULSES

BACKGROUND OF THE INVENTION

1. Field of the Invention

The present invention is directed to angle-sensing mechanisms for electric motors and, in particular, for synchronous machines.

2. Description of Related Art

Electric motors are used for a multiplicity of applications; depending on the particular use, not only the speed itself, but also the rotor position being relevant. Sensing the rotor position is particularly relevant when switching on electric machines since, relative to the stator's magnetic field, the rotor position directly and significantly influences the absolute value and sign of the torque generated. Sensing the correct angle of the rotor position is particularly relevant for the operation of synchronous machines where essentially no difference in speed ("slip") is provided between the rotor and the stator. Under certain circumstances, a deviation of only a few degrees can result in a very pronounced difference with respect to the torque. In synchronous machines, a peripheral magnetic field is generated by a multiplicity of mutually offset stator windings, the rotor having a permanently impressed direction of magnetization. In principle, the magnetic field of the rotor can be generated by a permanent magnet, an excitation winding or by a combination thereof.

It is known to use separate sensors, for example, inductive or optical sensors, for the purpose of angle sensing. The use of separate sensors entails additional space, additional costs, separate supply leads, and additional manufacturing steps, etc. Moreover, additional components have the inherent risk of generally being associated with additional sources of error.

Therefore, methods and devices are known for detecting the rotor position of a motor via the windings and the rotor, without the need for additional sensors.

The German patent publication DE 10 2006 004 166 describes a method for determining the rotor position of an electronically commutated motor, the different saturation limits of the rotor in various rotor directions being used to detect the rotor position. To this end, rise times up to defined limit values are recorded, from which it is possible to measure the saturation of the rotor portion covered by the magnetic field that is generated by a stator winding corresponding to the direction. The position of the rotor is sensed from the rise in the phase currents of the stator, since the rotor exhibits an angle-dependent saturation. On the one hand, the method is costly since the angular position is based on the combination of a multiplicity of various rise times that are indicative of the particular saturation, and, on the other hand, since the resolution is defined by the angular offset of two different stator windings, i.e., 60°, for example. Thus, this publication only provides for a correlation to specific angular sectors, but not for a more precise angle sensing.

The Austrian patent publication AT 397727 B describes a method that utilizes voltage pulses to determine the rotor angle. It provides for assigning inductances, which are derived from current pulses and corresponding induced voltages, to a sinusoidal characteristic of the inductance along the periphery, in order to determine the actual instantaneous position within the sinusoidal curve from the ascertained inductance values and the derivations thereof. A complex interpolation is required to assign the measured values to the assumed sinusoidal induction curve, so that rigorous demands are made of a measured-data processing unit which interpolates the voltage and current pulses to the sinusoidal curve. In addition, inaccuracies in the position can result at locations where the inductance only changes slightly with the angle, i.e., at +/−90°, for example.

Therefore, the absolute angle sensing methods mentioned above in the context of stationary electric motors are associated, on the one hand, with additional components, or they entail a costly calculation and, at the same time, are prone to a reduced accuracy and a high fault rate due to external stray fields. In particular, interpolation-based angle acquisitions require a considerable outlay for complex calculations; even in the case of minor measurement errors, the interpolation also leading to substantial angular errors.

BRIEF SUMMARY OF THE INVENTION

It is, therefore, an object of the present invention to devise a mechanism for precisely sensing the absolute angular position for electric motors that is able to be realized with little outlay for electrical components and using simple evaluation mechanisms.

The present invention permits a precise absolute angle determination for electric machines, in particular, for synchronous machines, without entailing additional components and through the use of a substantially simplified calculation method. The method may be implemented using low-cost components since it only requires a minimal computing capacity, achieves a high degree of precision, is influenced only slightly by external stray magnetic fields since a multiplicity of measurements are taken, and renders possible an angular position resolution of virtually any given precision. Already existing devices, which are connected to the electric machine, may be used both for the processing of the measuring method, as well as for generating and supplying the measuring pulses. Thus, the present invention makes it possible to precisely sense the angular position of the rotor at standstill, the maximum possible torque being attainable during the run-up process, already after a short measuring period. The method entails low costs, minimal spatial requirements, and is characterized by substantial ruggedness. In one preferred specific embodiment, the present invention also permits the unique acquisition of the angular position with respect to a complete 360° rotation without ambiguity in the 180° orientation. In particular, the method does not require any costly interpolation or interpretation of the measured values, but may be implemented exclusively using simple comparison processes and basic calculating operations. In particular, the present invention may be carried out using comparators and devices which generate a mean angular value, for example, as software that runs on a processor. In addition, the present invention may be realized using a hardwired circuit having a comparator, an adder circuit, and a device for halving a value.

The present invention is based on the detection of the inductance in different angular directions that are not only predefined by the orientation of a stator winding, but by the targeted sampling of the inductance in any given angular position, it being possible for any given angular position to be sampled using a suitable combination of at least two stator windings. The present invention provides for sensing the directionally dependent inductance of the combination of the rotor and the stator winding(s) acting thereon, the rotor being anisotropic in the direction of rotation. In other words, the rotor has a first magnetic behavior along a first axis that differs from the magnetic behavior along a second axis that differs therefrom. (Both axes are perpendicular to the axis of rotation of the rotor and intersect the same.) These axes may be the d-axis and the q-axis, for example, however, the present invention not being limited to two-pole rotors. Rather, in principle, the rotor may have any given number of magnetic pole pairs. The sampled property of the rotor is the inductance, respectively the flux, which is induced within the rotor core material by the applied external magnetic field (produced by the stator). In principle, an external magnetic field is applied (by the stator) in a specific angular direction, i.e., by a defined voltage pulse acting on the stator winding(s), and the current (delayed relative thereto) resulting therefrom, whose characteristics are given by: $u(t)=L*(di/dt)$. The ratio of these two quantities corresponds to the inductance, which, in turn, is dependent on the magnetic permeability, respectively, the magnetic susceptibility of the rotor (material) in this direction. The effective magnetic permeability of the rotor as a function of the angle is derived from the material of the rotor, in particular, from combinations of different materials of differing magnetic permeability and, in particular, from the shape of the rotor, which is not axially symmetric.

In addition, the saturation prevailing in the angular direction in question plays a role, the magnetic permeability decreasing with increasing saturation. In other words, an additional magnetic field results in an only slight increase in the magnetic flux in the material when the material has already undergone a strong premagnetization. For example, the premagnetization may be effected by an excitation coil (or by a permanent magnet or a combination thereof) of the rotor, the additional magnetic field component being externally predefined by the stator which, depending on the orientation, is either added to the premagnetization or reduces the same. If the externally applied magnetic field reduces the flux within the material, then a greater inductance results than in the opposite direction when the external magnetic field is added to the rotor's magnetic field (which relates to the premagnetization). Thus, the rotor emitting a magnetization pulse in two opposite directions makes it possible for its half-space orientation (or generally the north-south orientation of a pole pair of any given number of pole pairs) to be precisely recorded.

In accordance with the present invention, a plurality of magnetization pulses are emitted by the rotor in various angular directions, and the (stationary) rotor is magnetized. The pulse shape yields an induced voltage in the stator from which the effective relative permeability or another magnetic anisotropic quantity of the rotor may be recorded. The recorded voltages are compared to one another, and the lowest, respectively second lowest, or the highest, respectively the second highest voltage and the two corresponding angles are determined. Depending on the type of rotor (permanently excited or with excitation winding), the angle of the minimum of all minima corresponds either to the orientation of the d-axis (in the case of permanently excited machines), or the maximum of all maxima corresponds to the orientation of the d-axis of the electrical machine (in the case of machines having an excitation winding). Simple comparison operations yield the angular directions of the two maximum or minimum (subsequently extreme) angular directions, the present invention providing for an inductance measurement to be performed within the angular span that is defined by the two angular directions. In other words, an (intermediate) angle is provided which resides between the most extreme position (lowest minimum or greatest maximum) and the second most extreme position (second lowest minimum or second greatest maximum), and a magnetic field pulse, whose characteristic pattern extends in the direction of this angle, is generated by the rotor. The resulting value is compared, in turn, to the already existing values (or to values that were recorded together with this value), and a narrower angular span is derived between the now available two greatest extremes.

This angular span may now be divided again to be able to distinguish again between two different angular span subdivisions, of which that angular span subdivision which is limited by the two greatest extremes in each case is selected. An angular span is subdivided in that another angle, which resides between the two angular span ends, is provided, for example as an arithmetic mean, and the resulting two angular span subdivisions (left half and right half) may be compared to one another in that, for example, the sum or generally a combination of the span value of the two angles is used as a measure that corresponds to the two limits of the angular span subdivision. In principle, an angular span, respectively an angular sector is divided into at least two subdivisions, and the measurement or the comparison is repeated for the two halves in order to record the larger or the smaller of the two angular sectors. In accordance with one variant, only one measurement is performed along the angle which resides between the two limit angles of the corresponding angular sector and, for purposes of the comparison, the measurement results of the two limit values of earlier measurements are used. Alternatively, after subdividing an angular sector defined by the limit value, the measurement may also be repeated at the two limit angles, so that measurements of the two limit angles and along the intermediate angle are performed in the same operation, preferably immediately following one another, respectively within a predefined time span.

The measurement is performed by delivering a single voltage pulse into the stator windings, so that the voltage pulse generates a current flow in the stator windings which results in a magnetic field along a predefined direction. To precisely define the angle, either a single specific stator winding is controlled, or, to reach angles that reside between two different stator windings, these two windings (or a plurality thereof) may be acted upon by voltage pulses, which, in combination, lead to a magnetic field direction that corresponds to the desired angle. Preferably, the area of the voltage pulse in the timing diagram, the characteristic shape of the voltage pulse, and the magnitude of the voltage pulse are the same for all measurements. In the case of voltage pulses that are distributed over a plurality of windings, in order to thereby reach an intermediate angle, the added magnetic field preferably corresponds in terms of magnitude, pattern and area of the time curve to a magnetic field that is emitted by one single winding. In other words, the voltage pulse is divided among a plurality of stator windings, which, however, generate the same field pulse in the result as does a single winding. In general, instead of one single voltage pulse, a predefined sequence of voltage pulses may be used, for example, a sinusoidal signal that is modulated by a (broad) square-wave pulse, so that a sinusoidal signal is emitted for a predefined time duration that corresponds to that of the square-wave signal. The corresponding current signal may either be received through the rotor windings following the measurement, or, in principle, may also be tapped from the excitation winding, since the connection between the excitation winding and the stator windings is indicative of the magnetic coupling and, thus, of the effective anisotropic magnetic permeability. However, a voltage pulse is preferably transmitted to the stator winding(s), the ensuing characteristic curve of the current at the stator winding(s) being recorded.

Preferably, merely the peak value of the current pulse is recorded, i.e., the maximum of the characteristic curve. This may be stored as a peak value in a memory or input into a computation unit. Depending on the type of excitation (permanent magnet or excitation winding), the two lowest or highest of these peak values are ascertained, and the resulting angular sector, respectively the resulting angular span is subdivided again by an angular direction that is disposed therebetween. Another measurement is then performed along this intermediate angle.

The present invention is based on an iterative process, the angle to be sensed being approached by the repeated division of an angular sector, the selection being made between two angular sectors that exhibit the two maximum or minimum (i.e., extreme) peak values. In a first iteration stage, generally referred to as (m) iteration stage, an (m) magnetic field of an (m) angular direction is generated, and the corresponding (m) peak value is recorded. In this (m) iteration stage, one or two further peak values are also provided, either by retrieval from a memory in which measuring results of previous measurements are stored, or by measuring along the one or two other angular directions. The two other peak values for the two further angular directions are then measured if no measurements had previously been performed in the corresponding two further angular directions or if the measurement results are outdated. To determine when the measurements are outdated, a peak value may be stored together with a time indicator or a sequence indicator to indicate the up-to-dateness of the measurement results. In one particular example embodiment, three measurements are performed in each iteration stage, and no measurement results are stored for use in subsequent iteration stages.

Thus, within a (first) (m) iteration stage, a value is actually recorded, the (m) peak value, and one or two further peak values are provided (either likewise by measurement or by retrieval from a memory); the further peak values being designated as (m+i) peak values. The corresponding angular directions are designated as (m+i) angular directions. All angular directions differ within one iteration stage. In accordance with one example embodiment, the (m) angular direction resides between the (m+i) angular directions, so that the (m) angular direction corresponds to an iteration approximation step.

Once three peak values for three angular directions are available in one (m) iteration stage, the corresponding measurement results of the preceding stage that form one peak value group are compared at the beginning of a subsequent (n) iteration stage, and the two highest or the two lowest peak values of this peak value group are used to ascertain the next angular sector to be analyzed. The two highest, respectively the two lowest peak values of the peak value group are designated as the peak values of the (n+1) angular direction and the (n+2) angular direction and form the basis for the next angular sector to be examined, which is again to be subdivided. Instead of a subsequent subdivision which leads to two further angular subsectors, the (n) angular direction disposed between the two highest, respectively lowest peak values may be output as a final result, i.e., as a recorded angular position. In the case that the sectors are still too wide and a greater accuracy is desired, the measurement is performed in the (n) angular direction. The (n) peak value is compared to the greatest peak value of the preceding iteration stage, i.e., to the greater of the two (n+i) peak values. The (n) peak value and the greater of the two (n+i) peak values form the basis for the next angular sector to be examined.

Units of a preceding iteration stage are described by (m), (n) describing units that result from a selection based on the (m) iteration stage and that are compared and selected at the beginning of an (n) iteration stage. During each iteration stage, a plurality of magnetic fields, angular directions and peak values are defined, retrieved, respectively measured, "(m)" or "(n)" denoting a newly recorded field, direction or a value. The addends "+i," "+1" and "+2" denote further peak values or angular directions that were already measured in a preceding step and are thus either measured again or may be taken from the preceding stage. Thus, the new measured value, which corresponds to the intermediate angle, is denoted by (m) or (n), i.e., without an addend, such as +1 or +n.

At the beginning of the process, a starting iteration stage is preferably provided, where the rotor is first at standstill, for example, due to deceleration. The rotor is preferably maintained at standstill for the entire process.

At the beginning, three starting magnetic fields are produced in different starting angular directions, and the corresponding starting peak values are recorded. As already noted, a starting peak value corresponds to the maximum of a starting current pulse that was generated by a predefined starting voltage pulse. Thus, the measurements are all performed in the same manner in all angular directions, independently of the association with an iteration stage or a starting iteration stage. During the starting iteration stage, the particular angles are preferably uniformly distributed over a total angle, the total angle corresponding to $(360°/p)$ and p being the number of magnetic poles of the rotor. p is 2, for example, when the rotor only has a south pole and a corresponding north pole. Thus, due to the 180° ambiguity, only half of a complete rotation ($=360°$) is covered in the case of a machine having one pole pair. Here as well, depending on the type of motor excitation, the highest or lowest peak values are recorded; the lowest peak value(s) is/are used in the case of permanently excited electric motors, and the two highest peak values are preferably used in the case of the motor excited by an excitation coil. However, this correlation is not necessary; rather it may also be reversed when a 180° offset is considered.

In each iteration stage (except for the starting iteration stage), the two angular directions corresponding to the highest or lowest peak value are ascertained, and the resulting angular sector, respectively the resulting angular span is divided into two parts. The two angular subdivisions may correspond to two equal sized angular intervals, for example, in the case of an arithmetic combination of the two angular directions, to determine an intermediate angle. In principle, however, the intermediate angle, which divides the angular span, does not necessarily need to reside in the middle, but may be weighted as a function of the peak value corresponding to an angular direction. If, for example, the two greatest peak values are ascertained, and the two peak values differ, then the next angular direction that subdivides the angular span may reside all the closer to the angular direction having the highest peak value, the more the peak values differ. The weighting and the combination may be effected by: multiplying a value, which represents the corresponding peak value, by the corresponding angular orientation, respectively angular direction, summing the weighted angular directions that correspond to the highest (or lowest) peak values and, if indicated, normalizing the thereby obtained angular direction. When the greatest peak values are sought, then the weighting factor is all the greater, the greater the degree by which the peak value of the corresponding angular direction exceeds the arithmetic mean of the two peak values of the two greatest angular directions. Directly proportional or linear dependencies between the weighting factor and the excess of the voltage pulse over the mean of the voltage pulses may be used. If the two lowest peak values are sought, then the weighting factor of the angular direction is all the greater, the greater the degree by which the peak value of the angular direction falls below the mean of the two peak values. In this case as well, proportional (by the factor −c, c constant and positive) or linear (decreasing) dependencies may be used in order to determine the weighting factor from the peak value.

Instead of measuring only one new angular direction per iteration stage, in general, a plurality of angular directions may also be measured per iteration stage by delivering a voltage pulse to the rotor windings. In particular, only one voltage pulse, whose current response is used, may be utilized per angular direction. Alternatively, however, two magnetic fields, whose angular direction is +45° or −45° distant from the actual angular direction, are generated per angular direction; at this point, as a rating factor, not the maximum of the particular voltage pulse itself, but rather the particular maxima of the voltage pulses being provided as a peak pair value whose difference is used as a decision basis for selecting the angular sector half. Apart from that, the method is analogous to the method described above; in the method described above, the peak values, i.e., the maxima of the particular voltage pulses, being used as a basis for the rating, which are superseded in the alternative specific embodiment by the difference between two peak values that are obtained in angular directions +/−45° offset from the angular direction to be recorded. Therefore, at this point, instead of ascertaining the two highest, respectively, the two lowest peak values to determine the correct angular sector half, the alternative specific embodiment provides for the two angular directions to be selected whose difference in terms of the particular corresponding +/−45° peak values is greater (in the case of motors having excitation winding), respectively whose difference corresponds to the two smallest differences (in the case of permanently excited motors).

In addition, instead of the peak value of a current pulse, its maximum time derivative may also be provided as a peak value. However, instead of a 45° offset, any given offsets to the actual angular direction to be recorded may be used, the angular differences being equal in magnitude. The angular difference between the angular direction to be actually recorded and the angular direction where the measurement is to be performed preferably corresponds to one fourth of the total angle, i.e., one fourth of 360°/p, p being the number of magnetic poles of the rotor. Therefore, if the rotor includes a north and a south pole (p=2), an angular difference of +/−45° relative to the angular direction to be actually recorded results.

The following consideration is the basis for this alternative embodiment, where, instead of along the angular direction to be recorded, a double pulse is emitted in two angular directions that are spaced equally from the angular direction to be recorded. The smaller the offset of the angular direction to be recorded is from the absolute minimum, respectively the absolute maximum, the smaller the change in inductance characterized by angle $dL/d\phi$ will be. In the worst case, it holds that $dL/d\phi=0$, so that the basis for deciding between the two angular sector halves is essentially determined by inaccuracies. As a result, the sensitivity of the method in the vicinity of the sought point is very poor when the sought point corresponds to an angular direction that is only slightly distant from the minimum or the maximum (depending on the type of motor). At this point, greater angular differences also lead to a slight difference in the buildup of current.

Figure 4:
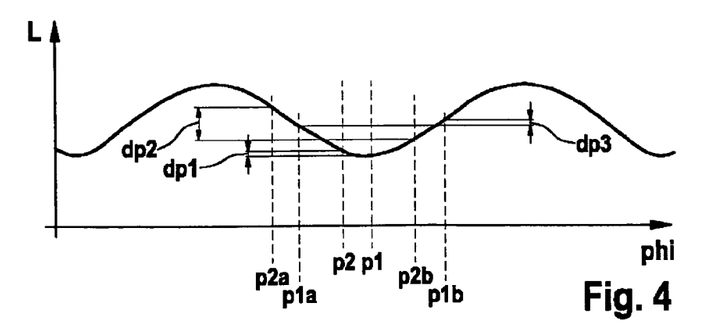
FIG. 4 shows an angle representation of an angle sensing according to the present invention in accordance with a double pulse specific embodiment in a coordinate system representation.

In the case of machines of customary design, inductance $L(\phi)$ is symmetrical to the extreme sought, i.e., symmetrical to the angular direction that corresponds to the absolute minimum, respectively the absolute maximum of the peak values. In accordance with the alternative variant, in which, per angular direction, a (preferably temporally offset) double pulse is emitted offset from the angular direction to be recorded, two angular directions $\phi 1$ and $\phi 2$ (which each represent an angular direction to be recorded) are recorded in the following manner and compared to one another. The single pulse variant may be combined with the double pulse variant, for example within one and the same acquisition process, the variants in accordance with the angular direction of the actual (preliminary) extreme of the peak values being selected in order to reach the maximum accuracy in each measuring step. Instead of emitting one single pulse in the direction of the angular direction to be recorded, and comparing the corresponding current rises, respectively the peak values thereof, the double pulse variant provides at this point for voltage pulses to be output by the stator winding at angles $\phi 1+45°$, $\phi 1-45°$, $\phi 2+45°$, $\phi 2-45°$ (this corresponds to two double pulses). If $\phi 1$ and $\phi 2$ are in the vicinity of the sought (absolute) extreme point, then the voltage pulses are output in the directions having the greatest gradient $dL/d\phi$. Thus, by shifting the angular direction from the angular direction to actually be recorded, the measurement is displaced from the "dead point" to the point having the greatest gradient and thus to the point having the greatest difference. Due to the symmetry of inductance $L(\phi)$ to the sought extreme point, it holds that: the closer $\phi$ is to the sought extreme point, the smaller the difference becomes between the current rise, respectively the peak value at $\phi +45°$ and $\phi -45°$. If $\phi$ is at the extreme point, then both current rises are equal; the difference is zero. A further clarification of this procedure is provided in Illustration 4. Therefore, what is sought in this variant is angle $\phi$, in the case of which the difference in the current rises, respectively the difference in the peak values at $\phi +45°$ and $\phi -45°$ is minimal. Thus, the differences between the two measurements of the double pulses are compared; as a general principle, the difference being able to supersede the peak value as a measure for angle sensing. Therefore, depending on the angular sector already acquired in a preceding iteration step, an approach may be to either use the method that targets the peak values or to use the double pulse variant. Within one measurement procedure, in accordance with the (preliminarily) selected angular sector, either the peak value along the angular direction to be recorded may be used as a basis, or two measurements along two measuring directions uniformly offset from the angular direction to be recorded may be taken, the difference in the measured pair then being used as a dissimilarity measure for the angular direction to be actually recorded.

The present invention is particularly suited for drive motors in electric-powered vehicles or hybrid vehicles, for example, synchronous motors having a permanently excited or excitation coil-excited rotor. In principle, however, the present invention is also suited for other fields of application where synchronous motors are preferably used and are started from rest at maximum torque or in accordance with a predefined speed characteristic, which requires a precise absolute angle sensing during standstill of the motor.

The voltage pulse may be emitted in accordance with any given characteristic, preferably in the form of a voltage characteristic, which has the same absolute value independently of the selection or grouping of connected stator windings (thus independently of its direction). In addition, the corresponding recorded current pulse may be normalized relative to the input voltage pulse. The current may be detected using a shunt resistor or a Hall sensor that is mounted on a lead. In addition, the effect of the voltage pulse on the rotor may be measured using voltage or current sensing at an excitation winding of the rotor.

To resolve the 180° ambiguity, an absolute orientation step is preferably performed, where measurements are taken along angular directions that oppose one another by 180° or, in the case of a rotor having more than two poles, in directions that correspond to a multiple of 360°/p, p being the number of magnetic poles of the rotor. In this case, orientation peak values of the current pulse that was generated by the orientation magnetic fields, are recorded, and the lowest or highest orientation peak value and the corresponding angular direction of the two or of all orientation peak values are recorded. The corresponding angular direction resides in an absolute orientation angular sector that is obtained by dividing an entire circumference into p angular sectors. Thus, in the case of a rotor having a north and a south pole, by comparing two different angular directions that are offset by 180°, respectively the peak values thereof, it is possible to discern the hemisphere (i.e., half angular extent) in which the rotor is oriented. In the case of rotors having an excitation winding, the greater of the two peak values corresponds to the hemisphere into which the magnetic north pole points. The rotor is preferably excited during the absolute orientation step; in the case of excitation coil-excited motors, this being effected by energizing the excitation winding.

Thus, the present invention is realized by a method according to the present invention or by a device which subdivides an angular sector that is delimited by two angular directions, the device being configured to ascertain the peak value (or the difference in the case of the double pulse variant) along this angular direction (and along other angular directions) to compare the particular values, to ascertain the two highest, respectively the two lowest values of the values by comparison, and to provide an angular direction that resides between the two angular directions of the two highest or lowest peak values. To provide an angular direction that resides between two angular directions, the device preferably includes an averaging device, which may optionally be coupled to a weighting device that weighs the angle specifications using the corresponding peak value or using a constant minus the peak value. In addition, the device includes comparison devices, which compare current pulses, preferably maximum values, respectively peak values of current pulses. In addition, the device preferably includes a control device for delivering a voltage pulse to the stator windings. The device may also include a memory which stores the two highest, respectively lowest peak values (or differences in the case of the double pulse variant), together with the corresponding angular direction specifications, or which only stores the angular directions of the highest peak values. To implement the double pulse variant, the device preferably includes a summing device, in order to output the angular directions that are spaced apart from the angular direction to be actually recorded, the summing device summing two amounts, which are equivalent in terms of absolute value and different in terms of sign, to the angular direction to be actually recorded. In addition, the device for executing the double pulse variant preferably includes a subtractor which computes the difference between the two peak values and transmits it for analysis to a comparator connected thereto.

The device also preferably includes a starting device having a starting angle which is a first approximation of the angular direction to be recorded. The starting device may be connected to a course sensor or an angular direction source that outputs the angular direction with a low degree of precision.

In accordance with the present invention, an angle-dependent inductance is acquired by injecting a voltage pulse and evaluating the resulting current pulse. Alternatively, a current pulse could also be injected, and the resulting voltage pulse could be analyzed to acquire the angle-dependent inductance. The injected current pulses/voltage pulses per se are preferably single pulses having a predefined characteristic. However, instead of one pulse, a predefined pulse sequence could also be injected.

DETAILED DESCRIPTION OF THE INVENTION

Figure 1A:
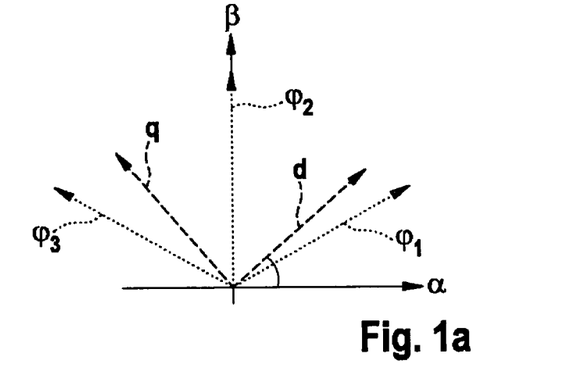
FIG. 1a shows an angle diagram for clarifying the initialization of the method according to the present invention.

FIG. 1a shows the initialization of the method according to the present invention with reference to a circuit diagram that is based on a rotor having a north and a south pole. The main magnetization direction, thus the field lines of the magnetic field produced by an excitation coil, extends along the axis characterized by d. The q-axis extends orthogonally thereto and corresponds to the transversal axis which is orthogonal to longitudinal axis d, the q-axis extending orthogonally to the field lines of the excitation magnetic field. Initially, the angular directions that are each offset by 60° from one another are scanned in accordance with the active scanning method, i.e., in that a voltage pulse is emitted in each of directions $\phi 1$, $\phi 2$ and $\phi 3$. In other words, three different voltage pulses are transmitted to the stator, which, as a result, generates three different magnetic fields in directions $\phi 1$, $\phi 2$ and $\phi 3$. The corresponding current characteristics are recorded.

Figure 1B:
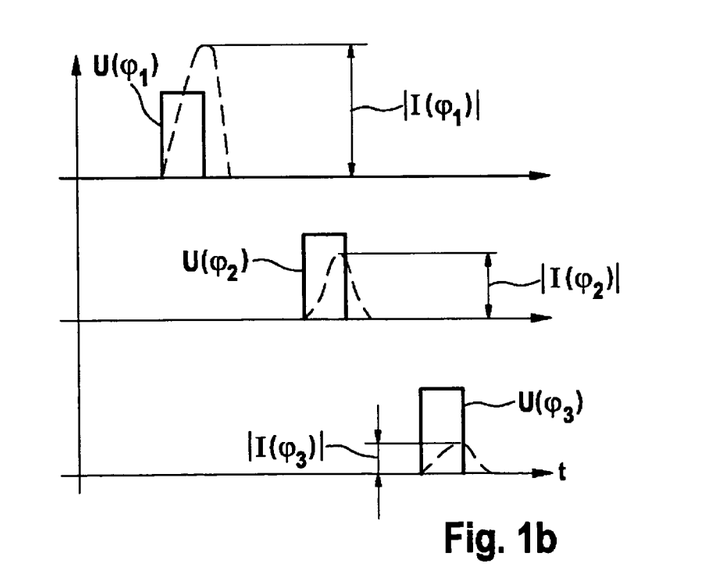
FIG. 1b shows a corresponding illustration of the characteristic voltage and current curves.

In FIG. 1b, U ($\phi 1$) indicates the voltage pulse that was transmitted to the rotor at a first point in time; U ($\phi 2$) indicates a second voltage pulse that was transmitted to the rotor; and U ($\phi 3$) a voltage pulse that was transmitted to the rotor following the two first voltage pulses. It is preferably always only one voltage pulse that is transmitted to the stator, there preferably being one minimum time duration between two voltage pulses. Voltage pulses, which belong to different angular directions, preferably do not overlap one another, but are rather spaced apart from one another by a minimum time interval. The currents generated by the voltage pulses are shown as dashed lines. It is discernible that the current rises in such a way that it is offset from the voltage and decreases only following the falling edge of the voltage. The particular inductance in this direction may be inferred from the phase displacement between the current and voltage. The maximum of the current characteristic is recorded as an absolute value, i.e., absolute value of I ($\phi 1$), absolute value of I ($\phi 2$), absolute value of I ($\phi 3$). It is discernible that the greatest peak value of the generated current pulse is at $\phi 1$, the next lower is at $\phi 2$, and the lowest current pulse is at $\phi 3$. In accordance with the present invention, the peak values are compared to one another, and the two greatest peak values, respectively the angular directions thereof, are transmitted to the next iteration stage. From the n diagram shown in FIG. 1b, it follows that the actual angular direction of the rotor is closer to φ1 than to φ2 (the peak value of φ2 is lower than the peak value of φ1), the lowest peak value having been recorded in direction φ3. It may be inferred herefrom that the greatest distance to the angular direction to actually be recorded is in direction φ3. In addition, it may be inferred that the absolute maximum of all peak values is between φ1 and φ2. The procedure illustrated in FIGS. 1a and 1b still encompasses a 180° ambiguity that may be resolved prior to or following the initialization process or following the iterative process. In addition, the initialization process illustrated in FIGS. 1a and 1b may be combined with the resolution of the 180° ambiguity in that a fourth angular direction is examined that opposes φ1. Thus, a half-space of 180° is completely covered, and, for example, by comparing φ1 to the angular direction that opposes φ1, the north-south orientation of the rotor may be ascertained. Thus, the acquisition in direction φ1 is used twice: on the one hand, for initialization (i.e., to ascertain a basic orientation of the rotor), and, on the other hand, for resolution of the 180° ambiguity, in that a measurement in direction φ1 and a measurement in direction 180° minus φi are performed.

Figure 2A:
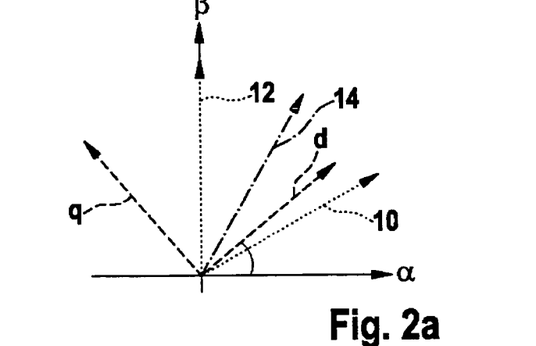
FIGS. 2a, 2b and 2c show an angle representation of the iterative angle sensing in accordance with the present invention.
Figure 2B:
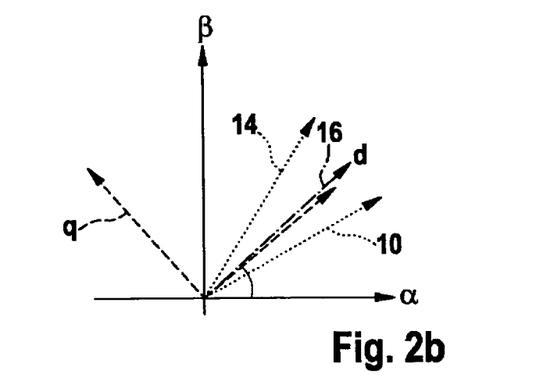
Figure 2C:
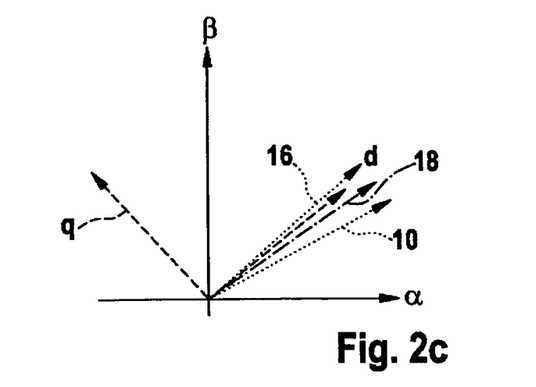

The sequence of the method for acquiring angles in accordance with the present invention is illustrated in FIGS. 2a-2c. q and d denote the main axes of the rotor. First, two angular directions are defined, 10 and 12. The angle diagram illustrated in FIG. 2a corresponds to that illustrated in FIG. 1a, so that the step illustrated in FIG. 2a corresponds to the step that follows the initialization step. Thus, directions 10 and 12 correspond to φ1, respectively, φ2. The reason why angular directions φ1 and φ2 were taken from the initialization step illustrated in FIG. 1 is apparent in FIG. 2b: The peak values of φ1 and φ2 were the two greatest values of all measured peak values. It is discernible from FIG. 1a that the sought angular direction of the main axis of the rotor, that is identified by d, is close to φ1. For that reason, in accordance with FIG. 1b, the greatest peak value i (φ1) was obtained at φ1. FIG. 2a illustrates that an angular direction disposed between 10 and 12 (=φ1 and φ2) is selected, in this case, by averaging. New angular direction 14 corresponds to an intermediate angle direction that is obtained, for example, by arithmetic averaging of directions 10 and 12.

The subsequent iteration step is shown in FIG. 2b; accordingly, the two angular directions of the two greatest peak values, 14 and 10, are taken from the preceding step. This corresponds to the step of providing for at least two peak values. The measurement along direction 16 serves to complete the iteration step and renders possible a comparison of the two sectors that reside between 14 and 16, respectively 16 and 10. The ascertainment of the two angular directions, in which the two greatest peak values are selected from a peak value group, may be provided as the beginning of the subsequent iteration stage, the peak value group including the peak values of angular directions 10, 16 and 14.

Subsequently thereto, however, still within the next iteration stage, an intermediate angle is ascertained in FIG. 2c between angular positions 10 and 16, angular directions 10 and 16 having already been determined in a preceding step of the same iteration stage as the two angular directions having the greatest peak values. Angular direction 18, which is disposed precisely in the middle between angular direction 10 and 16, is provided as the angular direction between angular direction 10 and angular direction 16. The mean between two angles is provided, for example, by arithmetic averaging. From FIGS. 2a-2c, it is discernible that, in each case, the newly added angular directions, i.e., 14, then 16, and then 18, increasingly approach the actual angular direction of the main axis of the rotor. Angular direction 18 may either be output or is used as a basis for a further iteration stage, together with angular direction 16, since, in addition to angular direction 18, it has the greater peak value. The comparison steps may be simplified in that, not the two greatest, but rather the smallest peak value and the angular direction thereof are ascertained. The smallest peak value and the angular direction thereof are then separated out. In the case of permanently excited electric motors, either the two smallest peak values and the angular direction thereof are ascertained and transmitted in the same manner, or the greatest peak value is ascertained, respectively, the angular direction thereof is then separated out. This method is particularly suited when altogether three angular directions are analyzed in each iteration stage, one of which is separated out, and the remaining two are transmitted to the next iteration stage.

When FIG. 2b is understood to be (m) iteration stage, and FIG. 2c is understood to be (n) iteration stage, then (m) angular direction corresponds to direction 16, since a magnetic field is applied therein. The corresponding (m) peak value corresponds to the corresponding (m) voltage pulse. Angular directions 10 and 14 may be considered as (m+i) peak values and the corresponding (m+i) angular directions, since they are merely provided, i.e., they are carried over from a previous iteration stage or a previous starting iteration stage, for example. The subsequent (n) iteration stage is shown in FIG. 2c, the (n+1) angular direction and the (n+2) angular direction being represented by 10 and 16 since they are already provided. Intermediate angle 18, which is generated in the (n) iteration stage as a new iteration value, is provided as (n) angular direction.

Figure 3:
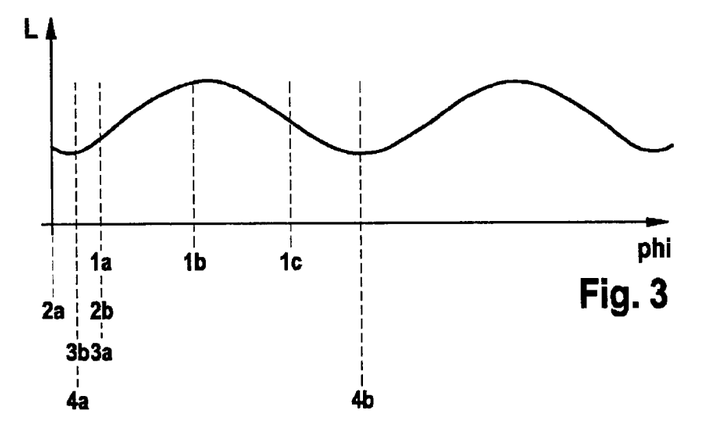
FIG. 3 shows an angle sensing in accordance with the iterative method for acquiring angles in accordance with the present invention in a coordinate system representation.

FIG. 3 illustrates the dependence of the inductance on angle φ. This is not necessarily sinusoidal, but depends, in particular, on the geometry and the material property of the rotor. First three initialization pulses 1a, 1b, 1c at equally spaced intervals are emitted; since they fan out broadly, the pulses already covering an angle of 120°. In FIG. 3, initialization pulse 1a is located at 30°; initialization pulse 1b at 90°, and initialization pulse 1c at 150°. Since the minimum is sought in FIG. 3, a single pulse sequence of pulses 2a and 2b is emitted. This is the consequence of a search for a minimum that revealed that the initialization pulses having directions 1a and 1c have the two lowest peak values. Thus, the voltage pulse at 2a corresponds to an angular position between 1a and 1c. Subsequently thereto, a single pulse sequence is emitted at 3a and 3b, the further evaluation steps not being discussed in detail. 3a and 3b correspond to directions 30° and 15°, whereas voltage pulses 2a and 2b were emitted in directions 0° and 30°. It is discernible that angular directions 1a, 2b and 3a are used further, for example, by retransmitting a pulse in this direction or by storing the corresponding peak value. Finally, voltage pulses 4a and 4b are emitted in angular directions 15° and 195°. These are used for the absolute angle orientation.

An angle acquisition in accordance with the double pulse variant is represented in FIG. 4. Angles p1 and p2 already reside near the sought minimum, making it difficult to correctly decide which two greatest or smallest peak values to select by comparing (the now very similar) peak values. The difference in inductance dp1 between p1 and p2 is small, whereby a differentiation may be error-prone. Therefore, for closer analysis of angular direction p1, a pulse pair is transmitted in directions p1a and p1b, p1a and p1b being +/−45° distant from p1. p1a and p1b are used for closer analysis of point p1. To analyze point p2, measurements are taken at angular directions p2a and p2b, which are likewise +/−45° distant from p2. The distance from +/−45° ensures that there is a differentiation maximum at these locations, whereas a differentiation minimum is provided at starting points p1 and p2. The differentiation maximum and differentiation minimum relate to the quality of the difference in the peak values. To now analyze points p1 and p2, the difference in the peak values between p1a and p1b is generated to analyze direction p1, the difference with respect to the inductance is denoted as dp3. To analyze p2 in the same manner, the difference in the peak values between p2a and p2b is analyzed, dp2 indicating the difference with respect to the inductance. It is clearly discernible that difference dp3 is able to vary greatly from difference dp2. Thus, as the result of comparative differences, an enhanced differentiating feature is obtained, since the values are distinctly different, and the differentiation may be reliably provided even in the case of noisy signals. In comparison thereto, the actual difference in inductance between p2 and p1 is represented as dp1, this being able to be related graphically to differences dp2 and dp3. It is readily discernible that difference dp1, which would result in the case of a single pulse measurement, leads to iterations that are considerably more difficult to differentiate, so that a slight noise may result in erroneous decisions. On the other hand, dp3 and dp2 are readily distinguishable, although starting points p1 and p2 reside in close mutual proximity. Even when the end result is very noisy, dp3 is readily distinguishable from dp2, so that, of these two values, the greater or smaller may be selected. On the other hand, between p1 and p2 themselves, it is not readily distinguishable which of the two points belongs to the lower inductance when typical measuring errors must be assumed. Thus, the differential between the differences in induction, respectively the corresponding peak value differences dp2 and dp3, is relatively great in comparison to the ability to distinguish between p1 and p2, respectively the corresponding peak values. FIG. 4 shows measurements for merely two angular directions, i.e., for p1 and p2. However, the method illustrated with reference to FIG. 4 may also be carried out using one single angular direction, or using three or more angular directions, which are each acquired by a double pulse pair. Voltage pulses are designated as a double pulse pair that are emitted in two different angular directions and, however, are spaced equally apart by the same angular direction to be actually recorded. The double pulse pair includes two voltage pulses that are executed one after another; a protection interval preferably being provided between the two voltage pulses to facilitate recording of the corresponding current pulses. As already noted, voltage pulses are always emitted individually and preferably in such a way that they do not overlap.

Figure 5A:
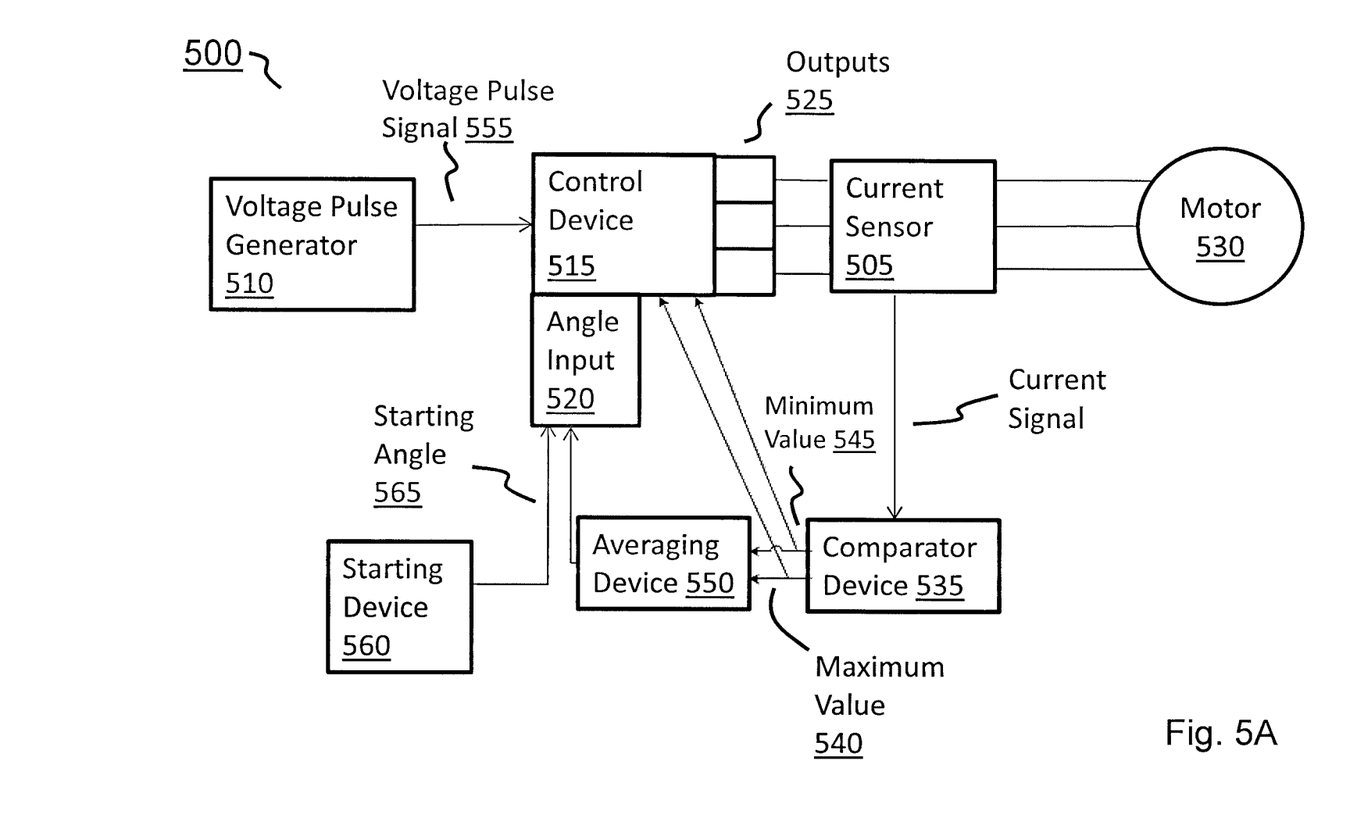
FIG. 5A shows a device for sensing angles of a synchronous motor in accordance with the present invention.

As seen in FIG. 5A, a device 500 for sensing angles of a synchronous motor 530 includes at least one current sensor 505 and a voltage pulse generator 510. The device 500 also includes a control device 515, connected to the voltage pulse generator 510. The control device 515 also has an angle input 520 and distributes the voltage 555 generated by the voltage pulse generator 510 over outputs 525. The outputs 525 are configured for connection of the synchronous motor 530, in such a way that the synchronous motor 530 generates a field having a direction corresponding to an angle signal being applied to the angle input 520, and wherein the at least one current sensor 505 is connected to the outputs 525 in order to record the currents flowing through the outputs 525. The device 500 also includes a comparator device 535 configured to compare the current pulses generated by voltages pulses in the case of different angle signals, to detect two greatest or smallest of all current pulses and two corresponding angle signals, and to output the two corresponding angle signals 540, 545 at an output of the comparator device, wherein the control device 515 communicates with the output of the comparator device 535. The device 500 also includes an averaging device 550 configured to average angles represented by the two angle signals 540, 545, wherein the averaging device 550 is connected to the angle input 520 in order to emit an averaged angle to the angle input in order to control the control device 515 in accordance with the averaged angle. In embodiments, the device 500 also includes a starting device 560 storing at least one starting angle 565, wherein the starting device 560 is connected to the angle input in order to transmit the starting angle 565 to the angle input 520.

Figure 5B:
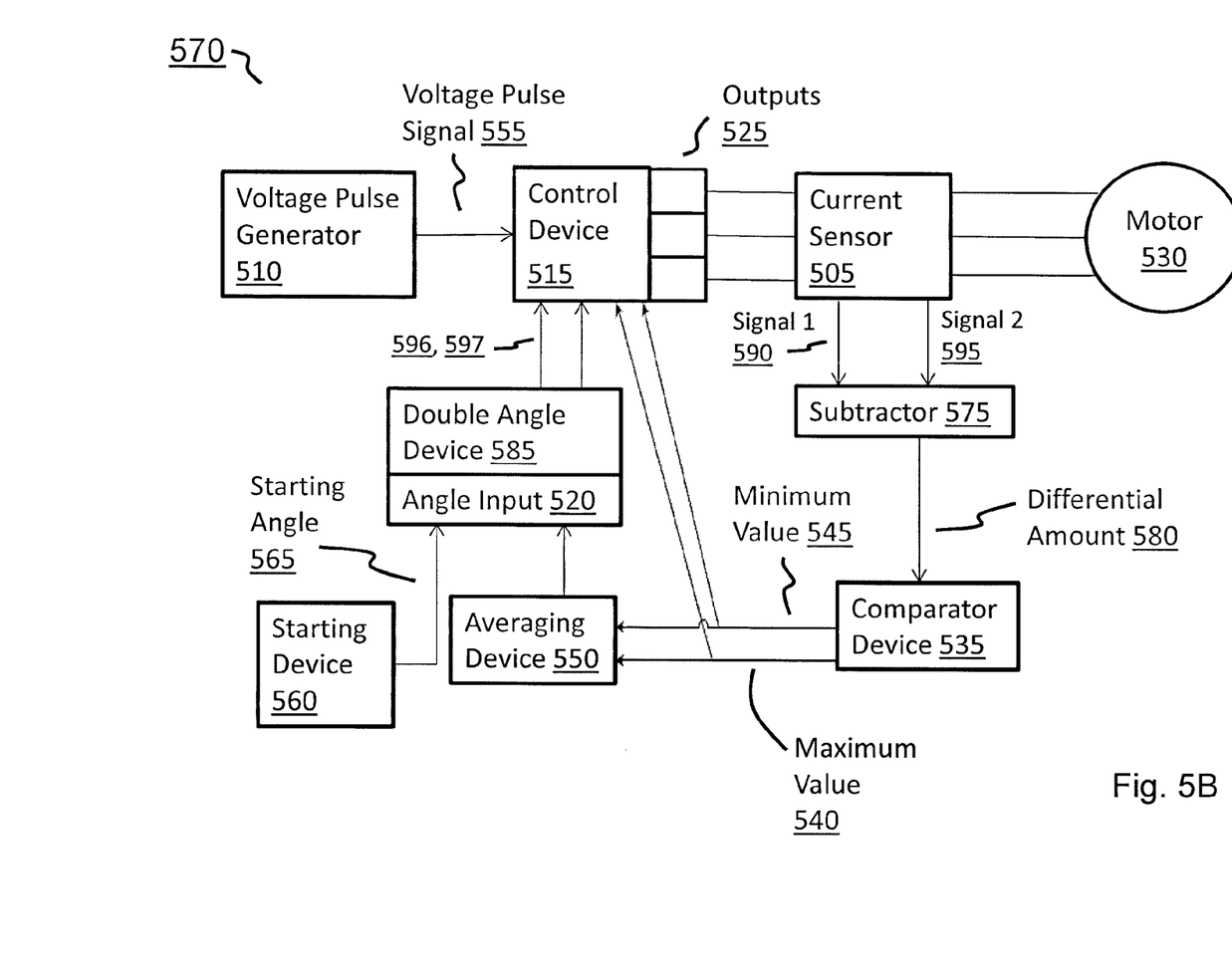
FIG. 5B shows a device for sensing angles of a synchronous motor in accordance with the present invention.

As seen in FIG. 5B, a device 570 for sensing angles of a synchronous motor 530 includes at least one current sensor 505 and a voltage pulse generator 510. The device 570 also includes a control device 515, connected to the voltage pulse generator 510. The control device 515 also has an angle input 520 and distributes the voltage 555 generated by the voltage pulse generator 510 over outputs 525. The outputs 525 are configured for connection of the synchronous motor 530, in such a way that the synchronous motor 530 generates a field having a direction corresponding to an angle signal being applied to the angle input 520, and wherein the at least one current sensor 505 is connected to the outputs 525 in order to record the currents flowing through the outputs 525. The device 570 also includes a comparator device 535 configured to compare the current pulses generated by voltages pulses in the case of different angle signals, to detect two greatest or smallest of all current pulses and two corresponding angle signals, and to output the two corresponding angle signals 540, 545 at an output of the comparator device, wherein the control device 515 communicates with the output of the comparator device 535. The device 570 also includes an averaging device 550 configured to average angles represented by the two angle signals 540, 545, wherein the averaging device 550 is connected to the angle input 520 in order to emit an averaged angle to the angle input in order to control the control device 515 in accordance with the averaged angle. In embodiments, the device 570 also includes a starting device 560 storing at least one starting angle 565, wherein the starting device 560 is connected to the angle input in order to transmit the starting angle 565 to the angle input 520. The device 570 can also include a subtractor circuit 575 configured to compare the differential amount 580 between two peak values 590, 595 which deviate by the same differential angle amount from the angle signal being applied to the angle input. Double angle device 585 generates two different angle signals 596, 597 at a double angle output from the angle signal being applied to the angle input, wherein the angle input is connected to the double angle device 585, whereby the control device 515 generates two voltage pulses in accordance with the two different angle signals.

What is claimed is:
1. A method for determining the angular position of a synchronous machine having a magnetically anisotropic rotor, comprising:
  performing an (m) iteration stage, including:
    generating an (m) magnetic field of an (m) angular direction having a strength which varies as a function of time by the application of an (m) voltage pulse to the synchronous machine and acquiring an (m) peak value of the current pulse generated by the (m) voltage pulse; and
    providing further (m+i) peak values which are generated by magnetic fields in different (m+i) angular directions and which differ from the (m) angular direction;
  performing an (n) iteration stage which follows the (m) iteration stage, the (n) iteration stage including:

ascertaining the angular directions in which the two highest or the two lowest peak values from a peak value group occur as an (n+1) angular direction and an (n+2) angular direction, the peak value group including the (m) peak value and the further (m+i) peak values; and one of:
(i) providing an (n) angular direction, which resides between the (n+1) angular direction and the (n+2) angular direction, as an angular position output; or
(ii) providing an (n) angular direction, which resides between the (n+1) angular direction and the (n+2) angular direction, wherein in the (n) angular direction an (n) magnetic field having a strength which changes as a function of time is generated by the application of an (n) voltage pulse to the synchronous machine, to acquire an (n) peak value of the current pulse generated by the (n) voltage pulse.

2. The method as recited in claim 1, further comprising:
performing a starting iteration stage which is executed before the (m) iteration stage, the starting iteration stage including:
providing the rotor at standstill;
generating at least three starting magnetic fields in different starting angular directions having a strength which changes as a function of time through application of starting voltage pulses, and acquiring corresponding starting peak values of the starting current pulses generated by the particular starting voltage pulses, wherein adjacent starting angular directions each being spaced apart by the same angular distance;
ascertaining two starting angular directions in which the two highest or the two lowest peak values of all starting peak values occur;
providing the (m) angular direction as an angular direction which resides between the two ascertained starting angular directions; and
providing the (m+i) angular directions as the two ascertained starting angular directions.

3. The method as recited in claim 1, wherein the generation of the magnetic fields having a strength which varies as a function of time includes applying a predefined voltage pulse to at least one stator winding, wherein the predefined voltage pulse has a predefined characteristic curve.

4. The method as recited in claim 1, wherein the provision of the (n) angular direction which resides between the (n+1) angular direction and the (n+2) angular direction includes one of:
providing the (n) angular direction as a sum of the (n+1) angular direction and the (n+2) angular direction divided by two; or
providing the (n) angular direction as the sum of the (n+1) angular direction and the (n+2) angular direction which are weighted in accordance with a predetermined weighting factor, wherein the smaller the weighting factor the greater the amount of deviation between the peak value and one of the smallest value of the peak value group or the greatest value of the peak value group.

5. The method as recited in claim 1, wherein the ascertainment of the angular directions in which the two highest or the two lowest peak values from the peak value group occur includes:
ascertaining the angular directions in which the two lowest peak values from the peak value group occur when the synchronous machine is a synchronous machine which is excited by a permanent magnet; and
ascertaining the angular directions in which the two greatest peak values from the peak value group occur when the synchronous machine is a synchronous machine which is excited by an excitation winding.

6. The method as recited in claim 1, wherein the generation of a magnetic field having a corresponding angular direction and acquisition of a peak value includes one of:
(a) generating a magnetic field that extends along the corresponding angular direction by suitably distributing the voltage pulse over different stator windings which each generate magnetic field components which extend as added components along the corresponding angular direction, and recording the current in a line to which the voltage pulse is applied, using one of a shunt resistor, a Hall sensor, or an indirect current detection device; or
(b) generating a magnetic field in one angular direction and recording a peak value by:
(i) generating two component magnetic fields, which are offset by the same angular difference to the one angular direction on both sides of the one angular direction, by suitably distributing the voltage pulses over different stator windings, the angular difference corresponding to one fourth of a total angle of 360°/p, p being the number of magnetic poles of the rotor; and
(ii) recording the difference in the amounts of the peak current values, wherein the one angular direction corresponds to the mean of the angular directions of the two component magnetic fields.

7. The method as recited in claim 1, further comprising:
performing an absolute orientation step including:
providing a rotor excitation by one of providing a permanent magnet or energizing an excitation winding;
generating orientation magnetic fields having a strength which changes as a function of time in angular directions 0° and 360°/p, p being the number of magnetic poles of the rotor;
recording the peak orientation values of the current pulse generated by the orientation voltage pulses; and
determining one of the smallest or the greatest peak orientation value and the corresponding angular direction; and
determining angles of the absolute orientation angular sector in which the corresponding angular direction resides.

8. A device for sensing angles of a synchronous motor, comprising:
at least one current sensor;
a voltage pulse generator;
a control device connected to the voltage pulse generator, wherein the control device has an angle input and distributes the voltage generated by the voltage pulse generator over outputs, which are configured for connection of the synchronous motor, in such a way that the synchronous motor generates a field having a direction corresponding to an angle signal being applied to the angle input, and wherein the at least one current sensor is connected to the outputs in order to record the currents flowing through the outputs;
a comparator device configured to compare the current pulses generated by voltage pulses in the case of different angle signals, to detect two greatest or smallest of all current pulses and two corresponding angle signals, and to output the two corresponding angle signals at an output of the comparator device, wherein the control device communicates with the output of the comparator device; and an averaging device configured to average angles represented by the two angle signals, wherein the averaging device is connected to the angle input in order to emit an averaged angle to the angle input in order to control the control device in accordance with the averaged angle.

9. The device as recited in claim 8, further comprising:
a starting device storing at least one starting angle, wherein the starting device is connected to the angle input in order to transmit the starting angle to the angle input.

10. The device as recited in claim 8, further comprising:
a subtractor circuit configured to compare the differential amount between two peak values which deviate by the same differential angle amount from the angle signal being applied to the angle input; and
a double angle device generating two different angle signals at a double angle output from the angle signal being applied to the angle input, wherein the angle input is connected to the double angle device, whereby the control device generates two voltage pulses in accordance with the two different angle signals.

\* \* \* \* \*

UNITED STATES PATENT AND TRADEMARK OFFICE
CERTIFICATE OF CORRECTION

PATENT NO. : 8,547,044 B2
APPLICATION NO. : 12/998197
DATED : October 1, 2013
INVENTOR(S) : Ulrich Vollmer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 257 days.

Signed and Sealed this

Fifteenth Day of September, 2015

Michelle K. Lee
*Director of the United States Patent and Trademark Office*